United States Patent [19]

Plost

[11] Patent Number: 5,311,698

[45] Date of Patent: May 17, 1994

[54] PORTABLE STORAGE FOR SMALL ITEMS

[76] Inventor: Herbert B. Plost, 2951 E. 56th Pl., Tulsa, Okla. 74105

[21] Appl. No.: 18,042

[22] Filed: Feb. 16, 1993

[51] Int. Cl.⁵ .............................................. A01K 97/00
[52] U.S. Cl. ....................................... 43/54.1; 43/57.1
[58] Field of Search ........................... 43/54.1, 57.1; 220/23.4, 480, 481; 206/315.11

[56] References Cited

U.S. PATENT DOCUMENTS

| | | | |
|---|---|---|---|
| 353,600 | 11/1886 | Sloan | 43/54.1 |
| 2,783,875 | 3/1957 | Shabarick | 206/16 |
| 3,179,255 | 4/1965 | De'Caccia | 211/60 |
| 3,350,810 | 11/1967 | Warner et al. | 43/57 |
| 3,897,650 | 8/1975 | Pilston | 43/54.1 |
| 4,682,691 | 7/1987 | Spiering | 206/373 |
| 4,765,470 | 8/1988 | Curci | 43/54.1 |
| 4,813,173 | 3/1989 | Abbotoy | 43/57 |
| 4,827,658 | 5/1989 | Wolniak | 43/54.1 |
| 4,947,577 | 8/1990 | Abbotoy | 43/57.1 |
| 4,953,765 | 9/1990 | Little et al. | 224/151 |
| 4,970,821 | 11/1990 | Young | 43/54 |
| 5,095,645 | 3/1992 | Borawski | 43/57 |

Primary Examiner—Kurt C. Rowan
Attorney, Agent, or Firm—Head & Johnson

[57] ABSTRACT

A container system for small items formed of an assembly having at least one planar back plate and a top plate extending perpendicularly therefrom, a plurality of open top, closed bottom containers with first short Velcro strips secured to the planar plate adjacent the top and second Velcro strips affixed to each of the containers so that the containers may be removably attached and supported by the first Velcro strips, the open top of each container being supported in close proximity to the top plate so that the top plate functions as a closure for the containers.

18 Claims, 3 Drawing Sheets

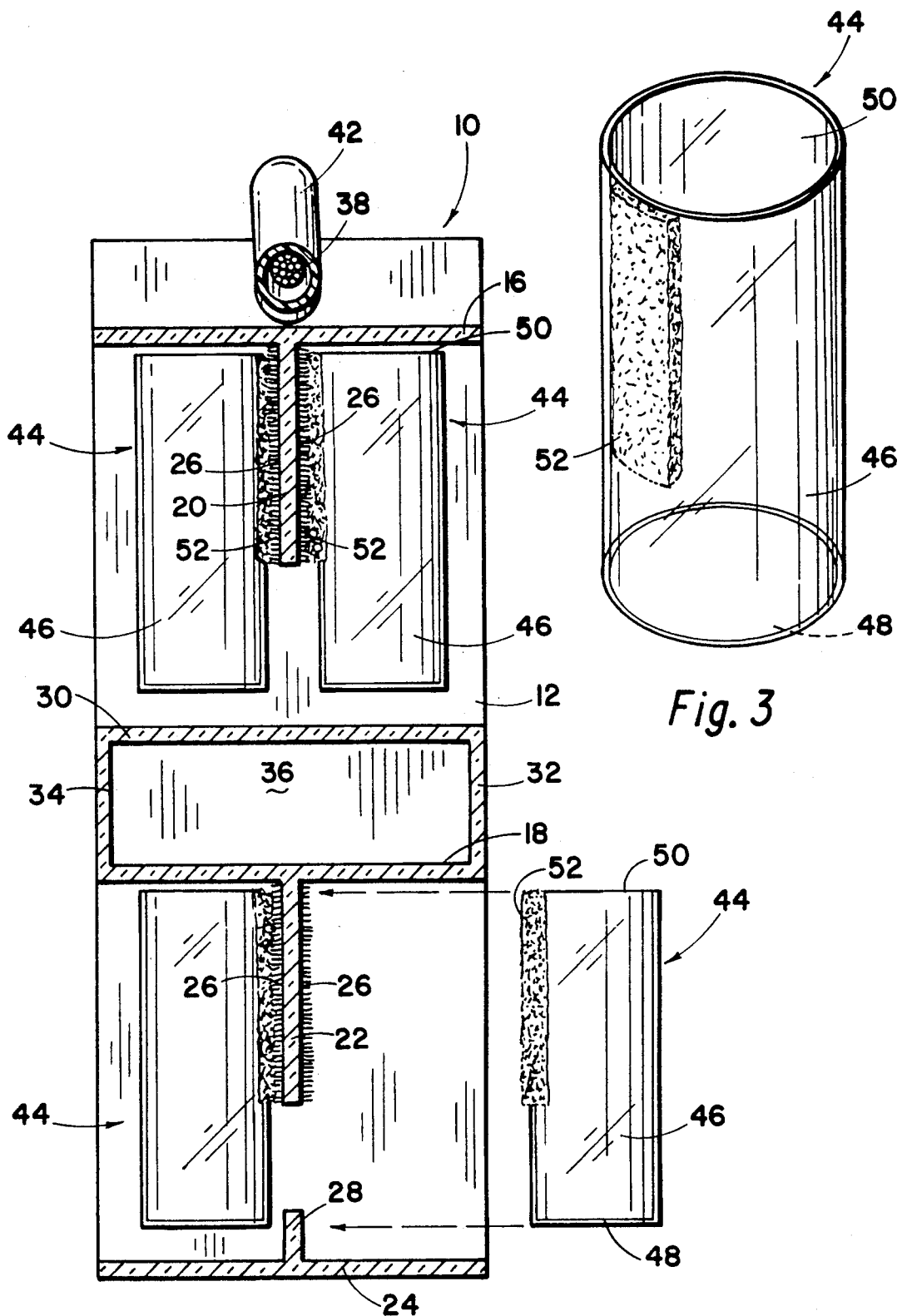

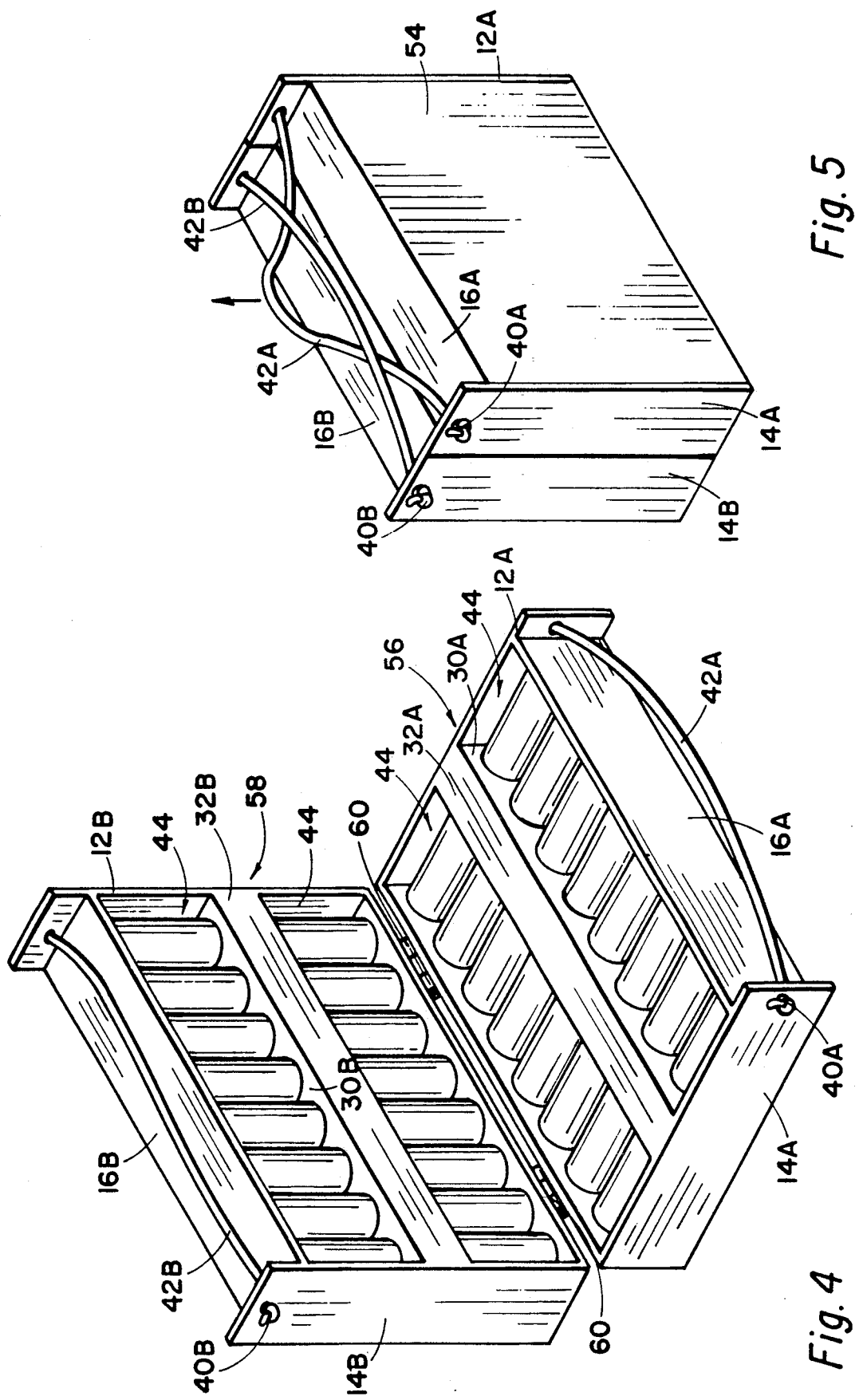

PORTABLE STORAGE FOR SMALL ITEMS

BACKGROUND OF THE INVENTION

Many different kinds of container systems exist for the storage of small components, such as fishing lures or other fishing equipment, screws, nuts, bolts, cotter pins, buttons and an unending number of other kinds of small items that people use in their work or as a part of their hobby or recreation. The container system of this disclosure will be described as it is particularly useful for fishing tackle, it being kept in mind that this is only by way of illustration and example and not by way of limitation. Nearly every fisherman has a fishing tackle box that contains trays or compartments with a large number of subdivided cubicles in which fishing lures, hooks, sinkers, swivels, etc, can be kept.

For examples of other type of storage systems for small items, reference may be had to the following U.S. Pat. Nos. 2,783,875; 3,179,255; 3,350,810; 4,682,691; 4,813,173; 4,953,765; 4,970,821; and 5,095,645.

The present invention is related to the basic subject matter of these previously issued patents but provides a unique container system wherein small items can be maintained in separate removable containers that can be quickly stored in such a way that it is not necessary to attach a cap or lid to the individual containers to prevent spillage. Another difference in the container system of the present disclosure is that it particularly facilitates the use of clear plastic so that the contents are readily visible.

SUMMARY OF THE INVENTION

The container system for small items of this invention is an assembly having at least one planar back plate. The planar back plate may be formed of thin, stiff material, such as thin metal (aluminum being an example) or preferably, stiff plastic. In the preferred arrangement the back plate is made of plastic due to its slight weight, strength, economy, and since it can be made transparent which, in some applications, is an advantage.

Affixed to and extending from the planar back plate is at least one top plate. The top plate extends perpendicular to the planar back surface.

A plurality of open top, closed bottom containers are employed. While the containers may be of metal, they are preferably of plastic and are preferably transparent. While the cross-sectional configuration of some or all of the containers may be square or rectangular, a preferred configuration is the use of a cylindrical container. Thus, in the preferred arrangement, each container is a short-length tubular member with a closed bottom and open top—an item of ultimate simplicity and economy.

Affixed to the planar back plate adjacent to the top plate is a first component of a hook-and-loop fastener system. This type of fastener system employs, as one component, fibrous matting, and as the other component a mat of short-length plastic hooks. This material is commonly known under the trademark "Velcro". When the two types of materials are pressed together they adhere to each other but can be separated without destroying either of the mats.

In the container system of this invention, a Velcro strip of a first type is secured to the planar back plate adjacent to the top plate. A Velcro strip of the second type is affixed to each of the containers. Where the containers are, as in the preferred arrangement, cylindrical tubes, a short-length Velcro strip is affixed to the cylindrical sidewall of each tube adjacent the open top.

Each of the open top containers is removably attached to the Velcro strip of the first type affixed to the planar back plate with the open top of each container being positioned adjacent to or in contact with the top plate. A plurality of the containers may be supported to the back plate, the containers being spaced as closely together as desirable with the only limitation being that the containers should be spaced sufficiently apart so as allow the fingers of a user to easily grasp an individual container to remove it from, or replace it in, the assembly.

The unique concept of this assembly is that it enables an user to expeditiously remove a container from the assembly to remove or add contents to the containers without the necessity of removing or reattaching a lid or closure on the individual containers. A further advantage of the container system is that the containers are preferably made of clear plastic so that an user can easily identify the objects therein and easily pick out the container required.

In an embodiment particularly useful as a fishing tackle storage system, top plates extend from opposite sides of the planar back plate so that containers may be secured to both sides of the planar back plate. In a still further embodiment, the system can include a plurality of vertical layers of top plates with a row of containers for each top plate. Further, when designed for use as a fishing tackle storage assembly, an air tight compartment can be provided so that if the assembly is dropped in the water it will float.

A better understanding of the invention will be had by reference to the following description and claims, taken in conjunction with the attached drawings.

DESCRIPTION OF THE DRAWINGS

FIG. 2 is a cross-sectional view taken along the line 2—2 of FIG. 1 showing more details of the construction of the container system of FIG. 1. FIG. 2 shows, in an exploded arrangement, how a container is positioned in the assembly.

FIG. 3 is an enlarged isometric view of a typical container as used with the assembly of FIGS. 1 and 2.

FIG. 4 is an isometric view of an alternate embodiment of the invention in which the container system is arranged like a suitcase in which two halves of the system are hinged together. This view shows one-half extending in a vertical, open position relative to the other half that is in a horizontal position.

FIG. 5 shows the arrangement of FIG. 4 in a closed position.

DESCRIPTION OF THE PREFERRED EMBODIMENT

Figure 1:
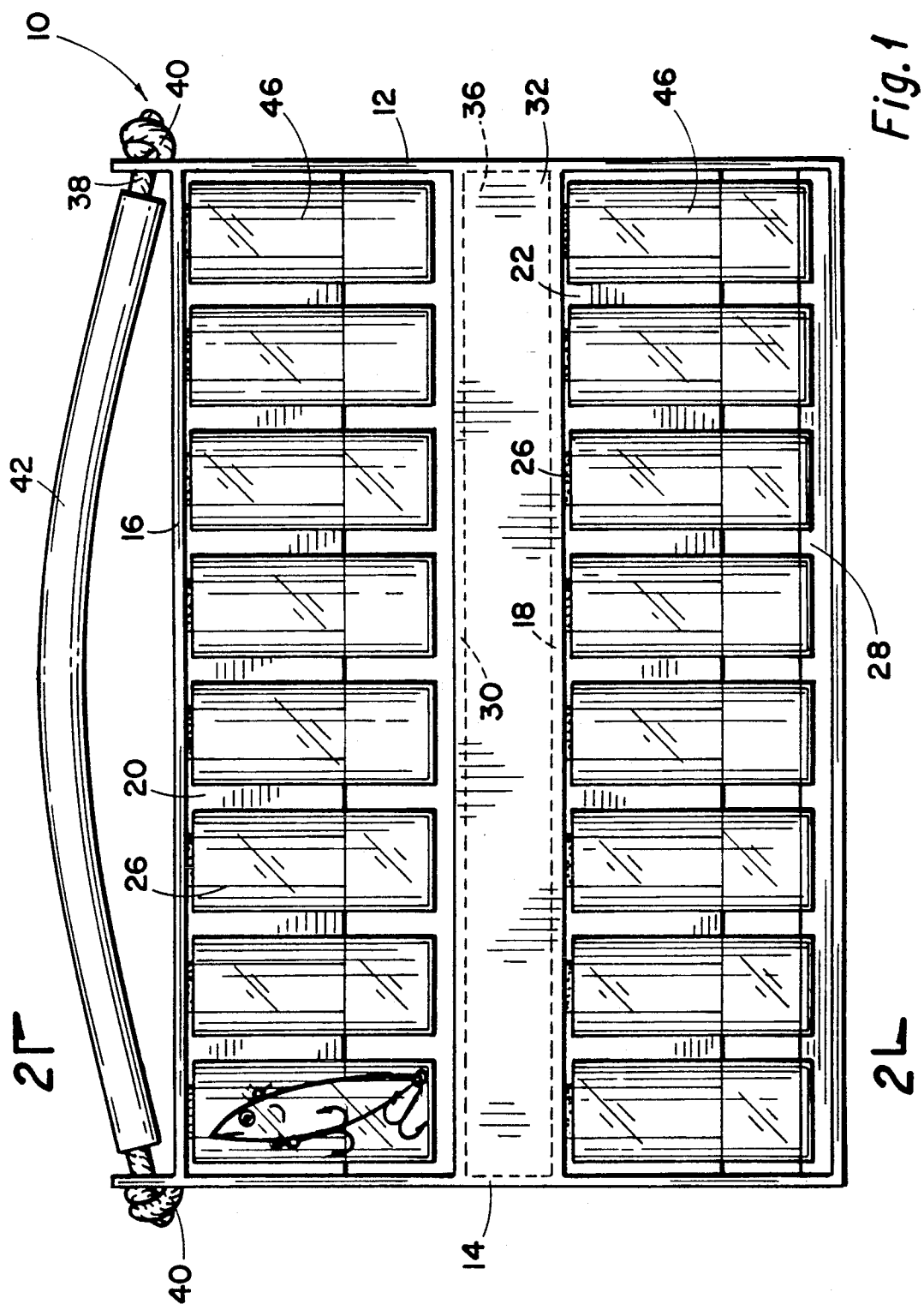
FIG. 1 is an elevational side view of one embodiment of the container system showing an arrangement particularly useful by fishermen in which the assembly includes four rows of containers arranged two on each side of the assembly with an air flotation chamber between the upper and lower rows.

Referring to the drawings and first to FIGS. 1, 2 and 3, a preferred embodiment of the invention is illustrated. A container system for small items is indicated generally by the numeral 10. FIGS. 1, 2 and 3 show a system useful as a lure container or a fishing tackle box, it being understood that the invention is not limited to this specific purpose and the illustration of the invention as a fishing tackle box is by way of example only. The container system of FIGS. 1, 2 and 3 includes opposed end plates 12 and 14 that are preferably made of a plastic sheet that may be transparent. Extending between end plates 12 and 14 is an upper top plate 16 and a lower top plate 18, the top plates being spaced apart from and paralleled to each other. Extending perpendicularly of the upper top plate 16, and intermediate the opposed edges thereof, is a vertical back plate 20 and, in the same way, extending perpendicularly from lower top plate 18 is a back plate 22. A bottom plate 24 extends between end plates 12 and 14.

Secured to both sides of upper back plate 20 is one mat component 26 of a hook-and-loop fastener system, such as fibrous matting 26. In like manner, fibrous matting 26 is attached to the opposed surfaces of lower back plate 22. The fibrous matting may be uniformly applied to substantially the entire surfaces of upper and lower back plates 20 and 22 or it may be, as illustrated in FIG. 1, applied in spaced apart narrow individual strips.

Spaced from lower back plate 22, as shown in FIG. 2, is a short-height foot plate 28 that extends between end plates 12 and 14. Foot plate 28 is in the same vertical plane as lower back plate 22 and is of short-height, leaving a space between the top of the foot plate and the bottom end of back plate 22.

In the illustrated arrangement wherein the container system is particularly designed for use to contain small items of fishing equipment, such as fishing lures, a flotation system is provided. This is achieved by employment of a closure plate 30 that is spaced from and parallel to the lower top plate 18 and extends from end plates 12 and 14. Sideplates 32 and 34 extend between end plates 12 and 14 and connect at their upper and lower edges with closure plate 30 and lower top plate 18 providing a sealed, air tight chamber 36.

End plates 12 and 14 extend slightly above upper top plate 16 and each has an opening therein that receives a rope 38. Each end of the rope is tied in a knot 40, and the rope receives a length of flexible plastic tubing 42. The combination of the flexible plastic tubing 42 and rope 38 forms a handle for ease of transportation of the container system.

The base of the container system has now been described. Next, the containers and the way they are used in conjunction with the base will be described.

While the containers may be of a variety of cross-sectional configurations, such as square or rectangular, an ideal system is that illustrated in FIG. 3 wherein each container 44 is a tubular member having a cylindrical sidewall 46, a closed bottom 48 and an open top 50. The cylindrical container 44 is somewhat preferred over a rectangular or square cross-sectional container for its simplicity and economy of construction and its adaptation to various configuration of devices. Further, container 44 is preferably transparent, but the invention is not limited to the use of transparent containers.

The system is unique in that it utilizes separate individual containers 44 in a manner that does not require caps or lids to close open tops 50 of the containers 44. This does not mean that a cap or lid cannot be used with the assembly if desired, but a unique feature of the invention is that it obviates the need of a cap or lid that must be removed and replaced each time a container is used.

Affixed to cylindrical sidewall 46 of each container 44 is a short strip 52 of a second type of a hook-and-loop fastener system or "Velcro" system as commonly employed. The strip 52 must be of the type opposite that of mat 26 that is secured to back plates 20 and 22. For instance, if component 26 is of the loop type, then fastener strip 52 on the containers will be of the hook type, although, obviously this arrangement can be reversed.

The lower portion of FIG. 2 shows the method of use of the container system. A container 44 is removed from the assembly. The open top 50 allows the user to easily and quickly remove or deposit items without having to replace a cap or lid. To return container 44 to the system the user simply inserts it into place with open top 50 adjacent to lower top plate 18. The Velcro portion 52 on the container removably attaches to the Velcro mat 26 secured to back plate 22. Foot plate 28 helps to correctly position the container in its location within the assembly. However, the use of foot plate 28 is optional, as none is employed in conjunction with upper back plate 20. Whether or not a foot plate 28 is necessary depends somewhat on the length of back plate 20 and the length of the Velcro materials 26 and 52. In addition, back plate 20 could extend all of the way and connect with closure plate 30 if required. Further, with the use of a foot plate 28, the length of lower back plate 22 and, therefore, the Velcro strip materials employed could be shortened.

A significant advantage of the system of FIGS. 1, 2 and 3 whether used by fishermen, repairmen, housekeepers, seamstresses or the like, is that the contents of the containers 44 are easily seen when the containers are transparent. This is particularly true when all of the components of the assembly, except rope 38 and perhaps tubing 42, are formed of transparent material.

FIGS. 4 and 5 show an alternate embodiment of the invention arranged in suitcase fashion. Two of the assemblies as shown in FIGS. 1, 2 and 3 are used except that the containers in FIGS. 4 and 5 are only affixed to one side of the back plates. Further, the back plates form the outside surface of the suitcase type assembly.

The vertically positioned half 58 of the assembly of FIG. 4 has a back plate (not seen) having Velcro strips thereon as described with reference to FIG. 2 that removably supports individual containers 44. Each of the container system portions 56 and 58 has first and second end plates, top plates, closure plates, bottom plates and sideplates as described with reference to FIGS. 1 and 2. The common components of the horizontal half of the system of FIGS. 4 and 5 are given numbers including the letter "A" and similar components in the vertical half 58 are given the letter "B". The halves 56 and 58 of the system of FIG. 4 are pivoted together by hinges 60. The system can be closed together in suitcase fashion. As shown in FIG. 5, the containers are fully enclosed when the portions 56 and 58 are hinged together in contiguous arrangement. To provide easy carriage of the suitcase system of FIG. 5, two of the ropes and plastic tube arrangements as described with reference to FIGS. 1-3 are employed.

The suitcase type arrangement of FIGS. 4 and 5 illustrate one means of employing the basic concepts of the invention and is merely exemplary of other arrangements which can employ the principles of this invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A container system for small items comprising:
   an assembly having at least one planar back plate and a top plate fixedly extending perpendicularly therefrom;
   a plurality of open top, closed bottom containers;
   first Velcro strip means of a first type secured to said planar back plate adjacent said top plate; and
   second Velcro strip means of a second type affixed to each of said containers whereby each said container may be removably attached to and supported by said first Velcro strip means, the open top of each said container being supported in closed proximity to said top plate whereby said top plate functions as a closure of said open tops of said containers and wherein said back plate has a first side and a second side, and wherein said top plate extends perpendicular to both said back plate first and second sides and wherein said first Velcro means is attached to both said back plate first and second sides adjacent said top plate, said plurality of containers being removably supported to both said sides of said back plate with said open tops adjacent said top plate.

2. A container system for small items according to claim 1 wherein said first Velcro strip means is in the form of a plurality of separate, spaced apart Velcro strips of the first type, there being a separate strip for each of said containers.

3. A container system for small items according to claim 1 including:
   a foot plate coplanar with and spaced from said back plate, the foot plate serving to maintain said plurality of containers in alignment when attached to said back plate.

4. A container system according to claim 1 including:
   a first and a second spaced apart paralleled end plate, said back plate and said top plate each having opposed ends fixedly secured to said end plates.

5. A container system according to claim 4 including:
   flexible handle means extending between said end plate.

6. A container system according to claim 1 including:
   a first and a second spaced apart paralleled end plate, said back plate and said top plate opposed ends being fixedly secured to said end plates; and
   hollow chamber means extending between said end plates and spaced from said top plate a distance greater than the length of said containers.

7. A container system according to claim 1 wherein at least some of said containers is of the type having a cylindrical sidewall, said second Velcro strip means being affixed to said cylindrical sidewall adjacent said open top.

8. A container system according to claim 7 wherein said containers are transparent.

9. A container system according to claim 1 including:
   a first and a second spaced apart paralleled end plate and including a first and a second back plate each having opposed ends fixedly secured to said end plates in uniplanar relationship and a first and a second top plate each having opposed ends fixedly secured to said end plates, the top plates being spaced apart and paralleled to each other, the assembly thereby supporting four rows of aligned spaced apart containers.

10. A container system according to claim 1 including:
    enclosure means for supporting said assembly therein.

11. A container system for small items comprising:
    an assembly having at least one planar back plate and a top plate fixedly extending perpendicularly therefrom;
    a plurality of open top, closed bottom containers; and
    a plurality of spaced apart attachment members secured to said planar back plate adjacent said top plate, there being an attachment member for each said container, whereby each said container may be removably attached to and supported by a said attachment member, the open top of each said container being supported by an attachment member in closed proximity to said top plate whereby said top plate functions as a closure of said open tops of said containers, and wherein said back plate has a first side and a second side, and wherein said top plate extends fixedly perpendicular to both said back plate first and second sides and wherein said attachment members are secured to both said back plate first and second sides adjacent said top plate, said plurality of containers being removably supported to both said sides of said back plate with said open tops adjacent said top plate.

12. A container system for small items according to claim 11 including:
    a foot plate coplanar with and spaced from said back plate, the foot plate serving to maintain said plurality of containers in alignment when attached to said back plate.

13. A container system according to claim 11 including:
    a first and a second spaced apart paralleled end plate, said back plate and said top plate each having opposed ends fixedly secured to said end plates.

14. A container system according to claim 13 including:
    flexible handle means extending between said end plates.

15. A container system according to claim 11 including:
    a first and a second spaced apart paralleled end plate, said back plate and said top plate opposed ends being fixedly secured to said end plates; and
    hollow chamber means extending between said end plates and spaced from said top plate a distance greater than the length of said containers.

16. A container system according to claim 11 wherein said containers are transparent.

17. A container system according to claim 11 including:
    a first and a second spaced apart paralleled end plate and including a first and a second back plate each having opposed ends fixedly secured to said end plates in uniplanar relationship and a first and a second top plate each having opposed ends fixedly secured to said end plates, the top plates being spaced apart and parallel to each other, the assembly thereby supporting four rows of aligned spaced apart containers.

18. A container system according to claim 11 including:
   enclosure means for supporting said assembly therein.

* * * * *